United States Patent Office 3,515,059
Patented June 2, 1970

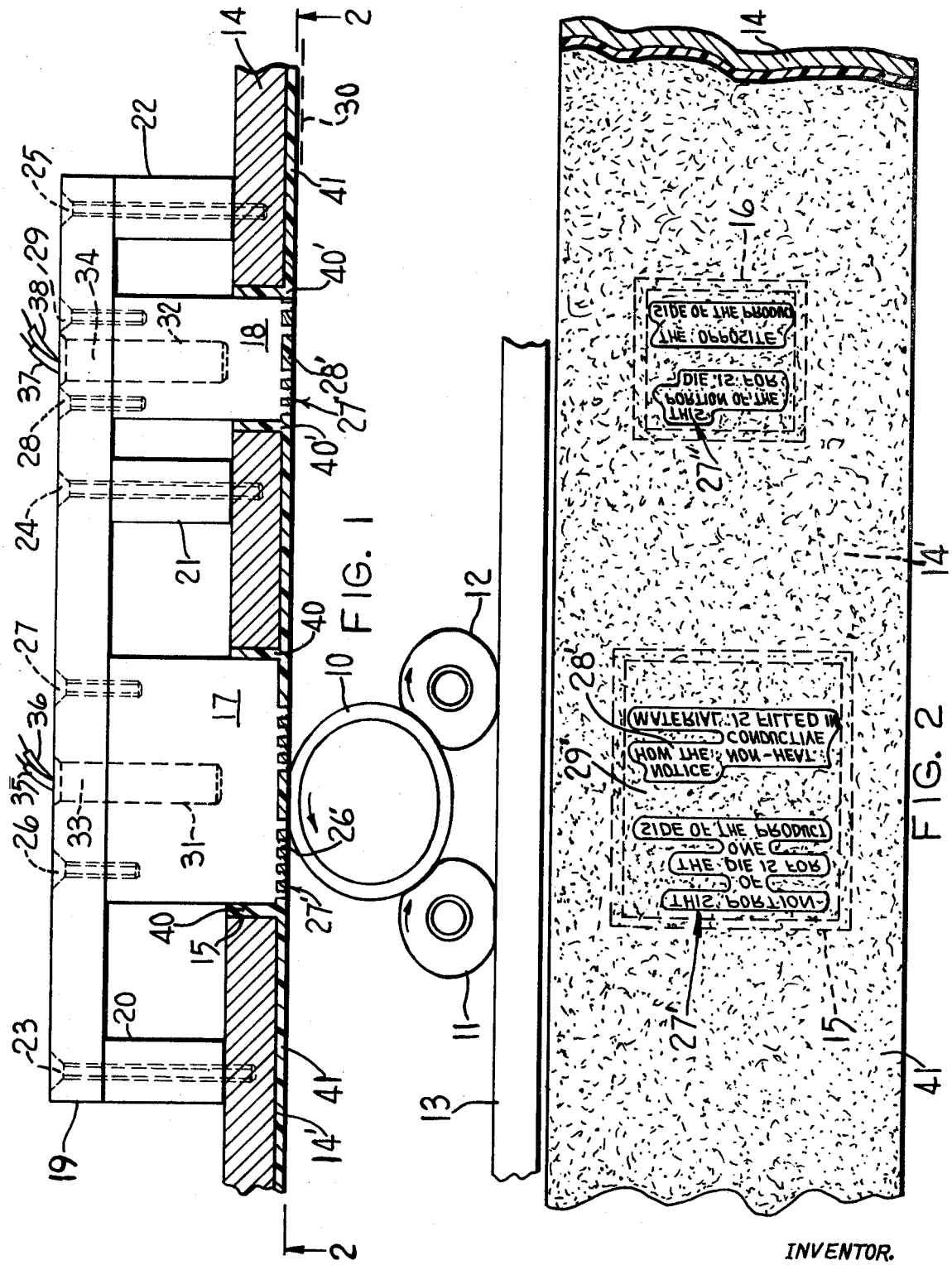

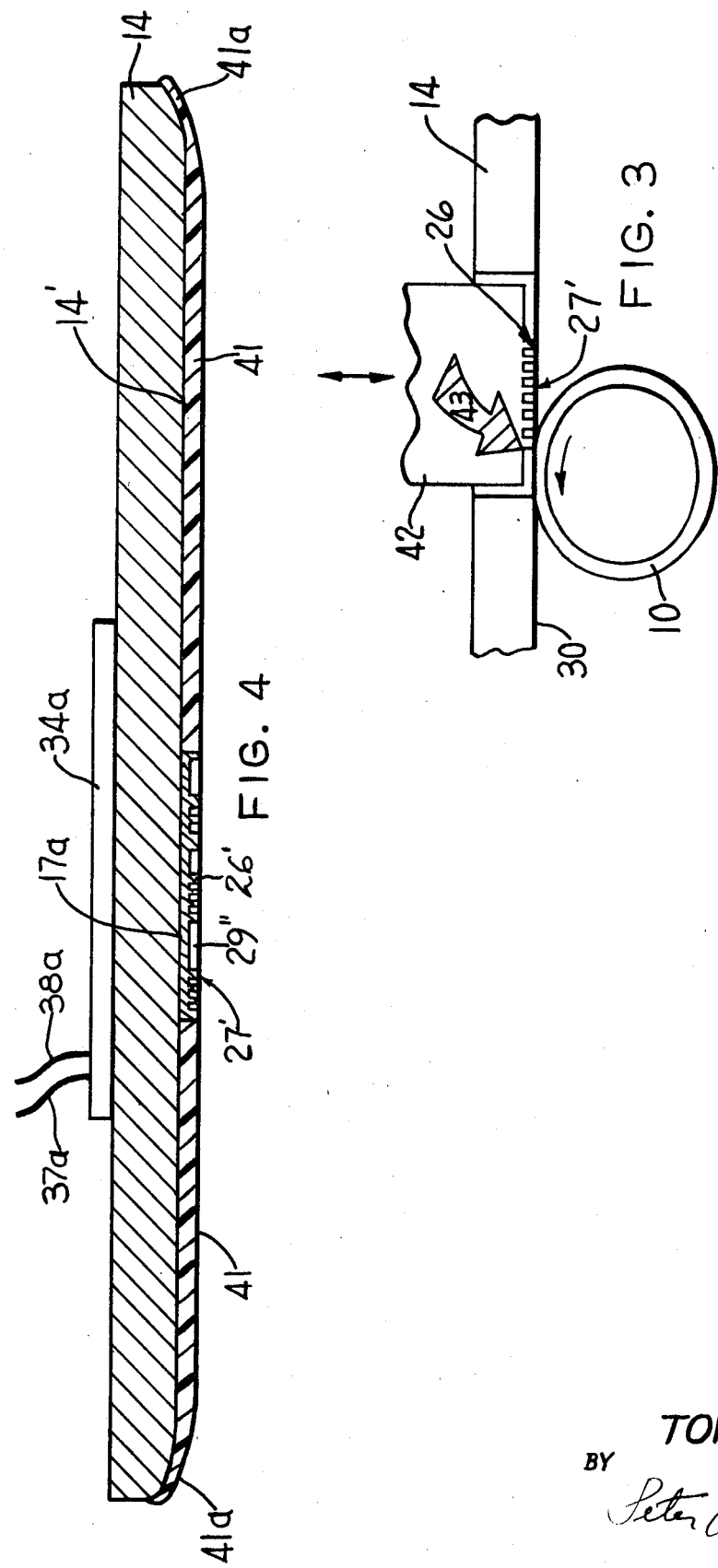

3,515,059
HOT STAMPING DIE HAVING INSULATED SURFACES ADJACENT THE DIE FACES
Tony Sciame, Linden, N.J., assignor to Patent Development Corporation, Linden, N.J., a corporation of New Jersey
Original application Nov. 20, 1967, Ser. No. 689,224. Divided and this application Mar. 5, 1968, Ser. No. 710,484
Int. Cl. B44b 5/00, 7/00
U.S. Cl. 101—31      1 Claim

ABSTRACT OF THE DISCLOSURE

In this invention, the heatable hot stamping heat-conductive die has projecting kerns terminating with die faces. A heat-resistant heat-insulating composition is used to fill in the spaces between the kerns as well as other recessed surfaces of the die. Also, the insulating composition is applied to the border of the die in a manner whereby the thickness of the insulating layer decreases with distance away from the die edges.

Cross references to related applications

This application is a division of copending application Ser. No. 689,224, filed on Nov. 20, 1967, by Tony Sciame.

Background of the invention

Hot stamping involves the application of colored images or imprints upon articles by placing a colored thermoplastic tape (such as thermoplastic gold foil) over the area to be stamped, and then impressing a hot die over the tape, whereupon the image from the die is applied in color (such as gold) on the article to be stamped. Imprints of excellent quality can be obtained, and there is no need to wait for ink to dry, as in the case of silk screen work. However, the technique suffers from the fact that the hot die must be removed immediately, as otherwise it might melt additional areas of the foil and thus effect a smearing, or it might even melt the object imprinted, which often is made of thermoplastic material.

Such limitations of this otherwise highly desirable process have forced the use of reciprocating hot dies which move onto the object, effect the imprinting, and then move away from the object. Such a die arrangement is described in the Sciame Pat. 3,301,174, and it is apparent that expense and complexity are increased by the necessity of such die reciprocating means.

Summary of the invention

According to the present invention, hot stamping now may be effected without use of a reciprocating hot die, thus removing one of the greatest impediments towards wider acceptance of this imprinting process. The invention comprises the use of a heatable heat-conductive stationary die in which all of the heated exposed surfaces, except the face of the die or type, are covered with an adherent, heat-resistant and heat-insulating solid composition. When the die is in use, it is also desirable to coat all adjoining surfaces which would be heated up to foil-melting temperature, so as to insure against any smearing effect caused by unwanted melting of the foil.

Brief description of drawings

The invention will be more readily understood by reference to the accompanying drawings, in which a preferred embodiment is described, and in which:

FIG. 1 depicts a cross-sectional elevational front view of a preferred embodiment of a die of the present invention, as used in a machine for hot stamping of rollable objects, the machine being schematically portrayed.

FIG. 2 illustrates a bottom view of the die face and die face assembly, taken along the plane of line 2—2 in FIG. 1, and FIG. 3 presents a schematic front elevational view of the unit of FIG. 1, but without the heat insulating coating.

FIG. 4 illustrates a cross-sectional side elevational view of an alternative embodiment of the present invention, wherein the die is attached to the bottom surface of the upper pressure plate.

The same numerals refer to similar parts in the various figures.

Description of the preferred embodiments

Referring to the drawings, numeral 10 refers to a cylindrical object, such as a cosmetic container, which is to be hot stamped. This object 10 is rolled to the die by two spaced and connected resilient rollers 11 and 12, which roll in gripping relation to rigid base plate 13 and to object 10. An upper rigid pressure plate 14 serves to apply the necessary vertical pressure on object 10 for adequate and effective image transfer. The stamping machine for this purpose is similar to that described in copending application Ser. No. 689,224, filed on Nov. 20, 1967, by Tony Sciame.

Upper pressure plate 14 is provided with openings 15 and 16, into which are inserted dies (or type bodies) 17 and 18. These dies (or bodies) are mounted, by means of screws 26, 27, 28, and 29 onto mounting plates, such as plate 19 having support legs 20, 21 and 22, which are attached to plate 14 by means of screws 23, 24 and 25. The dies and their mounting means will be referred to as the die assembly. The die assembly is mounted onto pressure plate 14 in a manner such that only the kerns or necks (beards) 26' of die faces 27', 27" protrude beyond the lower surface 14' of pressure plate 14. This protrusion generally amounts to a little less than 0.1".

Inserted in wells 31, 32 in dies 17, 18, respectively, are electric heater cartridges 33 and 34, respectively, having electric leads 35, 36 and 37, 38, respectively. These heaters serve to heat the dies (or type bodies) to the required melting temperature of foil 30 (FIG. 3).

Thereafter, all of the spaces 28' between the kerns 26' of the die faces 27'–27", as well as other recessed die surfaces 29'–29", and all of the pressure plate surface 14' which is subject to heating to a melting point of foil 30, which usually is about 275° F., are filled or coated with a heat-resistant, heat insulating plastic or resin composition, such as heat-resistant phenol formaldehyde resin, heat-resistant polyurethane plastic, heat resistant polynitrile rubber, fluoropolymers, or the like.

The plastic or resin insulating composition is usually applied in the form of a wet syrup or paste by means of a spatula or doctor blade. For example, a suitable insulating composition is a syrupy polyurethane sold commercially under the name "Devcon Flexane" by Devcon Corporation of Danvers, Mass. The polymer is first mixed with the required amount of catalyst or hardener paste, supplied with the polymer. Prior to pouring the insulating mixture onto the specified surfaces, it is desirable to coat the die or type faces with a film repellent, such as a conventional mineral oil grease. This is done to prevent the polymer from sticking to the die faces and thus requiring a cleaning operation for the faces. If desired, the entire die kerns and specified pressure plate surface 14' may be coated with the film of repellent, making subsequent removal of the hardened composition simple by a mere peeling operation, when it is desired to remove the insulating material. After application of the composition onto the surfaces to be coated, a glass plate, for example is pressed onto the faces of the dies until the die faces are clearly visible through the glass, showing that the faces are clean and in condition for use. Thereafter, the composition is allowed to harden, whereupon the assembly is ready for use. Spaces, such as spaces 40, 40', etc., are desirably also filled in with the heat-insulating composition, the latter being shown as stipling in FIGS. 1-2.

It is apparent, then, that when electric cartridge heaters 33-34 are heated by electric current passing through leads 35-36 and 37-38, respectively, only the uncoated projecting die faces 27'-27" will be at foil-melting temperature, and hot enough to melt foil 30 when object 10 is rolled under the die faces 27'-27", so that the image of the die will be transferred via the foil onto the surface of object 10. Obviously, foil 30 is fed intermittently between pressure surface 14 and object 10.

The heat insulating coating 41 also serves an additional function, as is apparent from FIG. 3, which shows a heat stamping machine having a vertically reciprocating die 42 having no heat-insulation coating, and similar to that shown in the Sciame Pat. 3,301,174. If the work were rolled against die face 27' in FIG. 3, it will be observed that the abrupt impact of object 10 upon the first kern projections 26' of die 42 (the impact area being indicated by arrow 43), the impact will tend to result in a heavy imprinting at the leading edges of the kerns, while a smudging would tend to take place at the trailing edges of the kerns. Such effects are even now well recognized as taking place with present die stamping techniques, using conventional stationary dies.

In FIG. 4, the alternative construction shown comprises a metal die 17a, attached by screws, or cemented on to the bottom surface 14' of pressure plate 14, using a heat-conductive heat-resistant cement, such as a silicone cement. A heat-resistant heat-insulating resin 41 is then applied between the kerns 29", and at the bottom surface 14' of pressure plate 14, which is subject to foil-melting temperature. The ends 41a of the plastic-coated surface may be tapered to eliminate any impact shock to the work rotated thereunder. It will also be noted that, since the type faces 27' of the kerns are level with the plastic coating 41, the projecting kerns will present no impact or trailing edge smearing problems. In FIG. 4, a flat plate heating element 34a, having electrical leads 37a and 38a, is employed for heating the die to foil-melting temperature. The aforesaid structure also eliminates considerable machining ordinarily involved in constructing the die assembly.

I claim:
1. A heat stamping die combination, comprising:
   a heatable die designed for hot stamping an image onto an article to be stamped with said image, and having projecting heat-conductive kerns terminating with die faces,
   a heater disposed adjacent to said die for heating said die to heat-stamping temperature,
   a heat-resistant heat-insulating composition adapted to withstand hot stamping temperatures and pressures and filling the spaces between said kerns and other recessed surfaces of said die in a manner such as to permit only the die faces to remain uncoated by said composition and thus remain at the melting temperature of the hereinafter-mentioned foil to serve as the stamping means, while the other heat-insulated portions of the die surface remain at below foil-melting temperature, and,
   a thermoplastic stamping foil disposed under said die for effecting said heat stamping operation.

References Cited

UNITED STATES PATENTS

| | | | |
|---|---|---|---|
| 2,255,718 | 9/1941 | Van Vorst | 101—31 X |
| 2,486,985 | 11/1949 | Ruderfer | 101—93 |
| 2,599,542 | 6/1952 | Carlson | 101—401.1 |
| 2,663,252 | 12/1953 | Kingsley | 101—31 |
| 2,715,360 | 8/1955 | Brown | 101—92 |
| 2,858,633 | 11/1958 | Kane | 101—27 |
| 2,909,990 | 10/1959 | Judisch | 101—32 |
| 2,939,386 | 6/1960 | Norris et al. | 101—28 |
| 3,299,809 | 1/1967 | Javorik et al. | 101—426 |
| 3,366,042 | 1/1968 | Birch | 101—27 |

WILLIAM B. PENN, Primary Examiner

U.S. Cl. X.R.

101—9, 25, 27